United States Patent [19]

Jain

[11] Patent Number: 5,450,246

[45] Date of Patent: Sep. 12, 1995

[54] REMOTELY ADJUSTABLE ANTI-GLARE VEHICLE MIRROR

[75] Inventor: Kanti Jain, Briarcliff Manor, N.Y.

[73] Assignee: ANVIK Corporation, Elmsford, N.Y.

[21] Appl. No.: 971,454

[22] Filed: Nov. 4, 1992

[51] Int. Cl.[6] ............................................. G02B 7/182
[52] U.S. Cl. ................................ 359/877; 359/874; 359/606
[58] Field of Search ............... 359/872, 873, 602–606, 359/874, 875, 877

[56] References Cited

U.S. PATENT DOCUMENTS

| | | | |
|---|---|---|---|
| 2,669,159 | 2/1954 | Rogers | 359/606 |
| 3,004,473 | 10/1961 | Arthur et al. | 359/606 |
| 3,550,456 | 12/1970 | Pringle | 359/604 |
| 3,655,273 | 4/1972 | Pringle | 359/606 |
| 3,664,729 | 5/1972 | Moore | 359/606 |
| 3,836,235 | 9/1974 | Russell | 359/605 |
| 4,084,886 | 4/1978 | Grosh et al. | 359/606 |
| 4,428,649 | 1/1984 | Main et al. | 359/877 |
| 4,693,571 | 9/1987 | Kimura et al. | 359/877 |
| 4,832,467 | 5/1989 | Miyagi et al. | |
| 4,955,705 | 9/1990 | Nakajima et al. | 359/603 |
| 5,076,674 | 12/1991 | Lynam | 359/603 |
| 5,205,182 | 4/1993 | Gilbert | 359/875 |

FOREIGN PATENT DOCUMENTS

| | | | |
|---|---|---|---|
| 3436016 | 4/1986 | Austria | 359/603 |
| 2178384 | 2/1987 | United Kingdom | 359/872 |

*Primary Examiner*—Georgia Y. Epps
*Assistant Examiner*—Thomas Robbins
*Attorney, Agent, or Firm*—Carl C. Kling

[57] ABSTRACT

A remotely controllable single/triple reflection glare-deflecting vehicle mirror provides remote control directional adjustment to an appropriate view, and also provides for easy and reversible toggling between single-reflection viewing and triple-reflection viewing. The mirror view adjustment is by remote control cables, selectively manually powered or powered by small linear motors. This view adjustment is maintained even during periods when glare conditions require that the wedge mirror be moved to anti-glare position, which is also done by remote control. The motor-powered version permits easy toggling from anti-glare triple-reflectivity to glare-susceptible single-reflectivity or back, by a tap switch. The manual-powered version permits easy toggling from anti-glare triple-reflectivity to glare-susceptible single-reflectivity or back, by a simple in-out motion of a glare control knob on the joystick used for view adjustment.

14 Claims, 4 Drawing Sheets

REMOTELY ADJUSTABLE ANTI-GLARE VEHICLE MIRROR

BACKGROUND OF THE INVENTION

1. Field of the Invention

This invention relates to vehicle mirrors, and more particularly relates to vehicle mirrors having viewer-controlled adjustments for remote, multi-axis directional alignment and glare reduction.

2. Description of the Prior Art

In numerous situations for drivers of vehicles, the reduction of glare due to reflections of incoming light from various sources is an important safety consideration. The glare is caused by light entering the vehicle from the rear, being reflected from one or more mirrors provided for viewing the rear scene, and then entering the driver's eyes. Such glare causes eye discomfort to the driver, makes it difficult for him to ascertain the overall driving scene, and thus creates a potentially hazardous road environment. Most frequently, such reflections that produce the undesirable glare result from headlights of other vehicles that are behind the viewing driver. At other occasions, light from the sun may cause the unwanted glare, particularly soon after sunrise or before sunset when the sun's rays are nearly horizontal. Clearly, the problem is most prevalent in night driving, when a driver is presented with reflections of the headlights from several vehicles following him. The situation is significantly exacerbated when the headlights of a vehicle directly behind the viewing driver are set to their high-beam position; in such cases the driver in question is practically blinded as far as his ability to view his rear scene is concerned.

The rear view is presented to the driver continuously at all times in at least two mirrors, and often in three mirrors. Thus, light beams from the headlights of vehicles behind the driver enter his eyes after reflections from a rear-view mirror mounted inside his vehicle near the top-center of the front wind shield, from a left-side rear-view mirror mounted outside the vehicle, and frequently also from a similar right-side rear-view mirror. For directional alignment, the inside-mounted mirror is adjusted manually. For directional alignment of the externally mounted mirrors, most vehicles provide remotely operated adjustment mechanisms mounted inside the vehicle. Whereas the reflections from all three mirrors are potential safety hazards, only one of these three mirrors—the rear-view mirror mounted on the inside of the front windshield—has a reflectivity adjustment that enables the driver to reduce the glare of intense reflections. The driver is forced to accept the glaring reflections from the left-side and right-side rear-view mirrors.

Currently no vehicle provides a left- (or right-)side rear-view mirror with a reflectivity adjustment feature. In view of such a limitation, there is an important need to develop and provide mirrors for automobiles that reduce glare from all reflections. This invention solves the problem of such glare by providing a side mirror having a remote-controlled high/low reflectivity adjustment as well as a remote-controlled directional alignment.

Different reflectivities for the inside-mounted rear-view mirror are obtained by employing a wedge mirror. Such a mirror is produced by using a tapered glass plate which is then conventionally silvered on one side. The mirror is mounted so that its unsilvered side first receives the incident light beam. The high/low reflectivity adjustment consists of a mechanical lever that turns the wedge mirror by an appropriate angle so that the incident light beam travels different paths on its way to the driver's eyes. The turning angle is such that in the high reflectivity position, light traveling to the mirror enters its tapered glass plate, is reflected by the silvered backside, exits the glass plate, and reaches the driver's eyes; whereas in the low reflectivity position, the beam reflected from the backside is again reflected from the front surface of the glass plate and reflected a second time from the backside before reaching the driver. All such mirrors that provide two different reflectivities and are used in road vehicles operate on the same basic principle in that they all use a wedge mirror; the variations among them are only minor, being in the mechanical lever arrangement for turning the mirror.

SUMMARY OF THE INVENTION

The invention describes multi-function optical reflecting devices, and specifically it discloses automobile mirrors for left-side or right-side rear-view application with multiple functionality through viewer-controlled combinational adjustments for different reflectivities leading to glare reduction as well as remote, multi-axis directional alignment.

The object of the invention is to provide a rear-view mirror having adjustment means for remotely operated control of the reflectivity of the mirror.

Another object of the invention is to provide a rear-view mirror having adjustment means for remotely operated control of both the reflectivity of the mirror and its directional alignment.

A feature of the invention is the provision of a wedge-shaped mirror that makes it possible to achieve different reflectivities by receiving the reflected light after different number of reflections within the mirror, combined with the provision of a remotely operated adjustment means to change the mirror setting between different reflectivity positions.

Another feature of the invention is the provision of a combinational remotely operated adjustment means that makes it possible to select both the reflectivity of the mirror and its directional alignment.

An advantage of the invention is its ability to provide glare-free views of the rear scene for a driver in all rear-view mirrors.

Another advantage of the invention is its ability to provide adjustments for both glare reduction and directional alignment in one remotely operated means.

Other objects, features and advantages of the invention will be apparent from the following specification and from the annexed drawings and claims.

BRIEF DESCRIPTION OF THE DRAWINGS

FIG. 7b shows an example of the electrical contacts used in the remote control unit of FIG. 7a.

DESCRIPTION OF THE PREFERRED EMBODIMENTS

Figure 1:
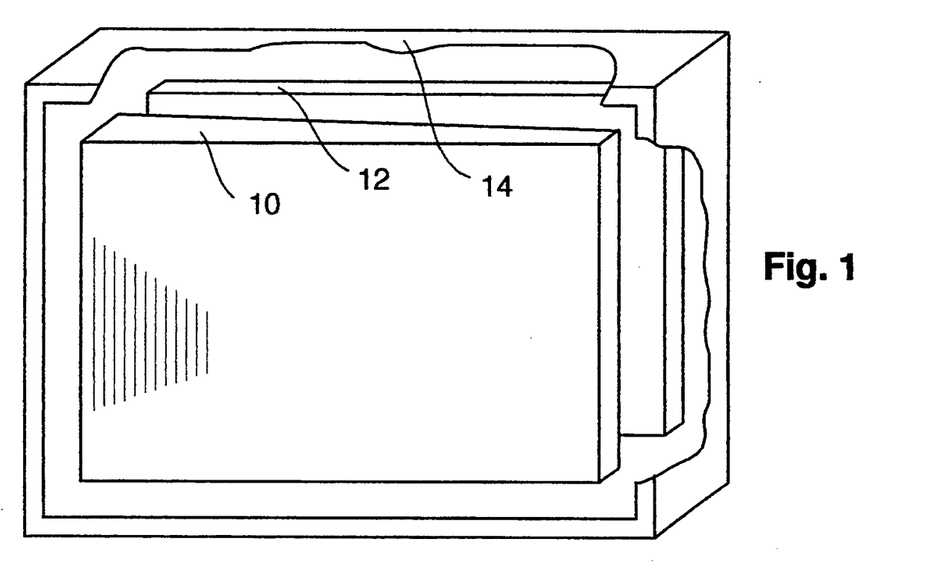
FIG. 1 illustrates the front view of a multifunctional mirror assembly, showing a wedge mirror, a tilt plate and a mirror housing.

I describe the invention through its specific embodiment as a glare-free left-side or right-side rear-view mirror for automobiles. FIG. 1 presents the overall mirror assembly, showing a wedge mirror 10, a tilt plate 12 and a housing 14. The adjustment means for directional alignment and reflectivity setting of the mirror are not shown in FIG. 1. The entire assembly is mounted at a suitable location on the outside of the automobile and the remotely operated controls for the adjustment means are situated inside the automobile. The details of the adjustment means will be described below with reference to FIG. 2. Operation of the directional alignment control adjusts the tilts (both left-right and up-down) of the tilt plate, whereas operation of the reflectivity control sets the left-right tilt of the wedge mirror. Several configurations for these adjustment means and their remote controls will be described in the following.

Figure 2:
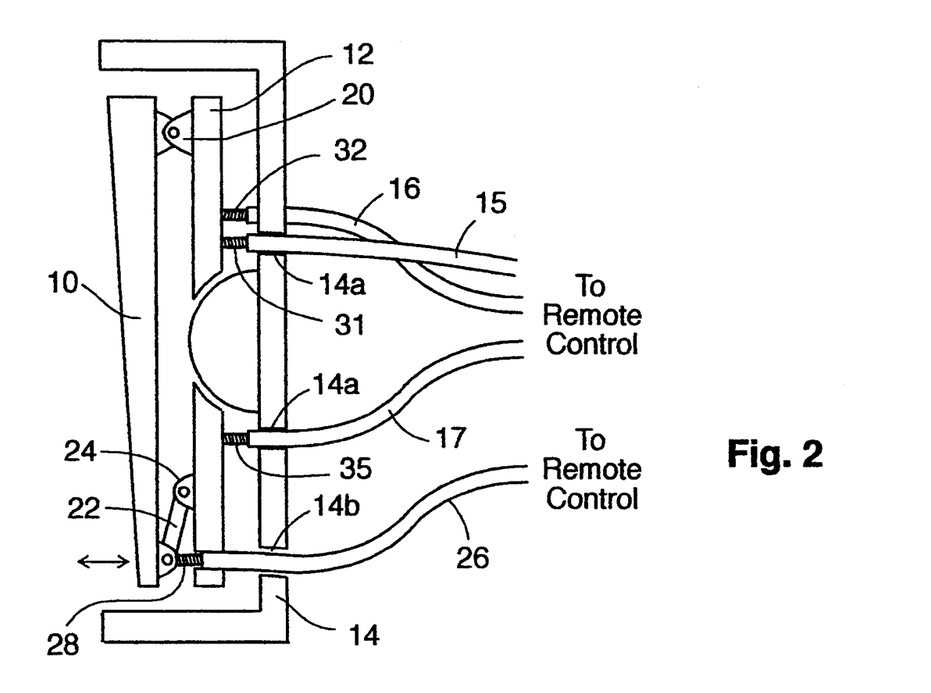
FIG. 2 presents a side view of the multifunctional mirror assembly, illustrating details of the adjustment mechanisms for directional alignment and reflectivity selection.

The adjustment means for reflectivity selection is a single-axis lever device that selects the angle, from one of two fixed settings, that the mirror makes with respect to a fixed reference. A convenient fixed reference is the line of sight from the mirror to the automobile driver's eye. When switching between the two settings, the mirror turns in such a way that a normal to it moves in a substantially horizontal plane. A schematic illustration of such a reflectivity adjustment means is shown in FIG. 2. Note that the orientation of the mirror assembly in FIG. 2 is such that it presents a horizontal section taken through FIG. 1 and viewed from above. The wedge mirror 10 is attached near one of its ends to the tilt plate 12 with a hinge 20. The other end of the wedge mirror is attached to a mirror reflectivity adjustment lever 22 which is connected to the tilt plate 12 by a second hinge 24. The view adjustment of mirror 10 is controlled by cables 31, 32 and 35 shown in FIG. 2. The mirror reflectivity adjustment lever 22 is so constructed that it "toggles," that is, it can be made to settle in one of two possible positions, and it is connected by a cable system 26–28 to a remote control lever (not shown) inside the automobile such that movement of cable 28 in its sheath 26 causes the mirror to assume one of its two possible angular positions. How these angular adjustments produce different reflectivities is described below with reference to FIG. 3.

Figure 3:
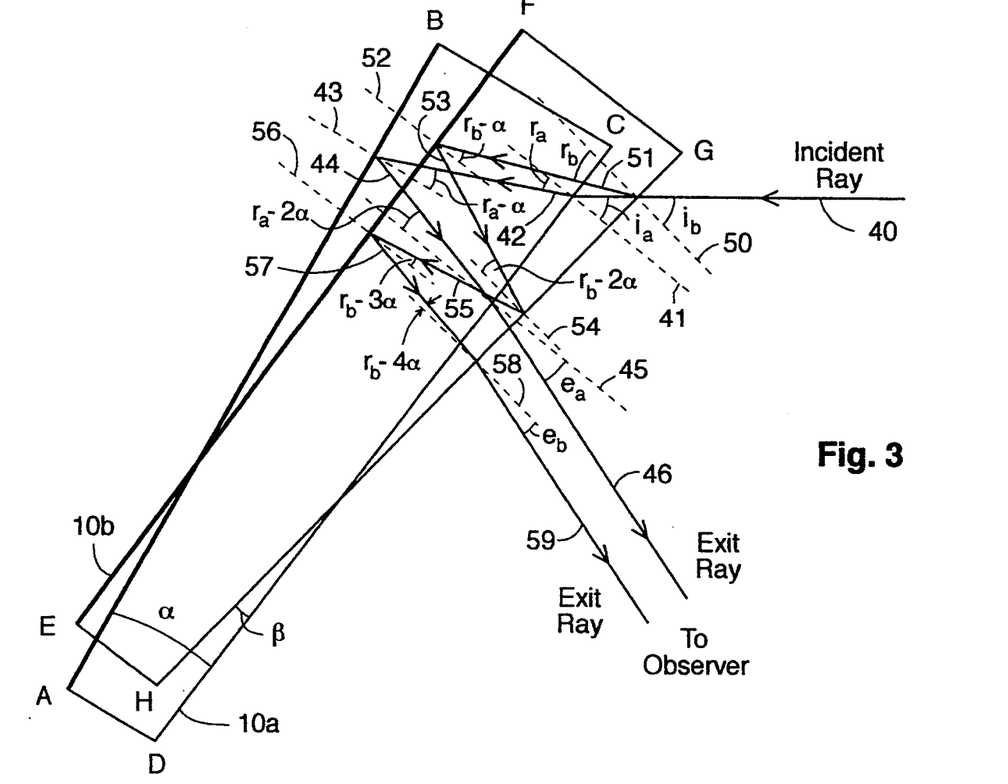
FIG. 3 shows the angular positions of the wedge mirror in the two reflectivity settings and details the optical ray paths for the two positions, illustrating how different angular settings produce different reflectivities.

The two possible angular positions of the mirror 10 of FIGS. 1 and 2 are shown as 10a and 10b in FIG. 3. Position 10a is for normal viewing, i.e., when no glare-causing lighting conditions are present. Position 10b is for situations when intense glare-causing light sources are present, e.g., headlights of a vehicle directly behind the automobile in the discussion or the sun in the rear horizon. The angular positions 10a and 10b are separated by an angle $\beta$. The silvered side of the mirror is shown in FIG. 3 by a heavy line as AB for position 10a and as EF for position 10b. The front surface of the mirror (CD or GH) is unsilvered. A beam of light from a light source striking the mirror is represented by an incident ray 40. After reflection(s) by the mirror, light entering the observer/driver's eye is shown as ray 46 for mirror position 10a and as ray 59 for mirror position 10b. Note that, optically, the primary difference between the two mirror positions is the nature of the reflections in the two cases. I describe this difference below and show how it produces different reflectivities.

Let us first consider position 10a. Here, the incident ray 40 strikes the front surface CD of the mirror at an incidence angle $i_a$ from the front-surface normal 41. After refraction, the ray entering the mirror is shown as 42, which makes an angle $r_a$ with normal 41. The refracted ray 42 next strikes the silvered side AB of the mirror at an angle $r_a - \alpha$ to the silvered-surface normal 43, where $\alpha$ is wedge angle of the mirror. Ray 42 is reflected by surface AB as ray 44, which strikes the front surface CD of the mirror, making an angle $r_a - 2\alpha$ with the front-surface normal 45. After refraction, the light which had originally impinged on the mirror as incident ray 40, finally exits the mirror as ray 46 at an angle $e_a$ to normal 45. The relationship between angles $i_a$, $\alpha$ and $e_a$ will be described in the following paragraphs.

Now let us consider the mirror position 10b, in which the mirror makes an angle $\beta$ with its previous position 10a. The incident ray 40 strikes the front surface at an angle $i_b$ to the surface normal 50 and refracts into the mirror as ray 51 at an angle $r_b$ to normal 50. Ray 51 is incident on the silvered surface EF at an angle $r_b - \alpha$ to the normal 52 and is reflected as ray 53. Ray 53 strikes the front surface GH at an angle $r_b - 2\alpha$ to the front-surface normal 54 and is reflected as ray 55. Continuing in a similar fashion, ray 55 next strikes the silvered surface EF at an angle $r_b - 3\alpha$ to normal 56 and is reflected as ray 57, which is now internally incident on the front surface at an angle $r_b - 4\alpha$ to normal 58, and finally exits as ray 59 making an angle $e_b$ to the front-surface normal 58. I will describe below the relationship between angles $i_b$, $\alpha$ and $e_b$. Further, describing the criterion for determining $\beta$, I will also elucidate the relationship between angles $i_a$, $e_a$, $i_b$, $e_b$, $\alpha$ and $\beta$.

In both positions of the mirror (10a and 10b), the exit rays (46 and 59) reach the driver's eyes. In other words, angle $\beta$ is such that rays 46 and 59 are parallel. The mirror position 10a is the 'high-reflectivity' position. In this position, the incidence angle $i_a$ is such that the exit ray 46 reaches the driver after one reflection in the mirror—by the silvered surface AB. Position 10b is the 'low-reflectivity' position. In this case, the relationship between angles $i_b$, $\alpha$ and $\beta$ is such that the exit ray 59 reaches the observer after three reflections in the mirror—two at the silvered surface EF and one at the front surface GH. Let us use the following optical values:

Incident intensity $= E_o$.
Reflectivity of the silvered surface $= R_s = 90\%$.
Reflectivity of the front surface $= R_f = 4\%$.

Then, the intensity of the exit ray 46 is $E_a = E_o \times R_s \times (1 - R_f) = 0.864 \ E_o$.

Similarly, the intensity of the exit ray 59 can be calculated to be $E_b = E_o \times R_s \times R_f \times R_s \times (1 - R_f) = 0.031 \ E_o$.

Thus, compared to the high-reflectivity position, the intensity of light reaching the driver in the low-reflectivity position is lower by a factor $E_a/E_b=28$.

The relationship between angles $i_a$, $e_a$, $i_b$, $e_b$, $\alpha$ and $\beta$ is derived as follows. First I remark that in FIG. 3, all angles have been shown as exaggerated—the actual angles that would be realistic when using such a mirror as a left-side or right-side rear-view mirror in an automobile will be much smaller. For example, the angles $\alpha$ and $\beta$ are well under 10°, and the angles $i_a$, $r_a$, $e_a$, $i_b$, $r_b$ and $e_b$ are in the vicinity of or smaller than 15°. Therefore, for all of the above angles, the approximations $\sin x = x$ and $\cos x = 1$ can be made with negligible error. Thus, $\sin 15° = \sin(0.262 \text{ radian}) = 0.259$, so that the approximation $\sin x = x$ gives an error of $<1\%$; or, $\cos 15° = \cos(0.262 \text{ radian}) = 0.966$, in which case the approximation $\cos x = 1$ produces an error of 3.4%.

Using n as the refractive index of the mirror glass, I have, for mirror position 10a:

$$\sin r_a = (1/n)\sin i_a \text{ or, } r_a = i_a/n. \quad (1)$$

$$\sin e_a = n \sin(r_a - 2\alpha) \text{ or, } e_a = n(r_a 2\alpha). \quad (2)$$

For mirror position 10b, I get:

$$\sin r_b = (1/n)\sin i_b \text{ or } r_b = i_b/n. \quad (3)$$

$$\sin e_b = n\sin(r_b - 4\alpha) \text{ or, } e_b = n(r_b - 4\alpha). \quad (4)$$

From equations (1–4) I get $$e_b - e_a = n\,r_b - n\,r_a + 2n\alpha = i_b - i_a + 2n\alpha. \quad (5)$$

Since $e_a - e_b = i_b - i_a = \beta$, Eq. (5) gives $$\beta = n\alpha. \quad (6)$$

The angles $i_a$ and $e_a$ are defined by the geometry of the automobile (i. e, the positions of the mirror and the driver). Eqs. (1–6) then determine all the other angles in FIG. 3.

As a quantitative example, I use
$i_a = 15°$, $n=1.5$ and $\alpha = 3°$.
Then
$r_a = i_a/n = 15°/1.5 = 10°$,
$\beta = n\alpha = 4.5°$
and
$e_a = n(r_a - 2\alpha) = 6°$.
Also,
$i_b = i_a + \beta = 19.5°$,
so that
$r_b = i_b/n = 19.5°/1.5 = 13°$
and
$e_b = n(r_b - 4.0 = 1.5°$.
With these values, note that
$e_a - e_b = 4.5° = \beta$,
so that the exit rays in the two mirror positions are co-directional, as required.

Figure 4:
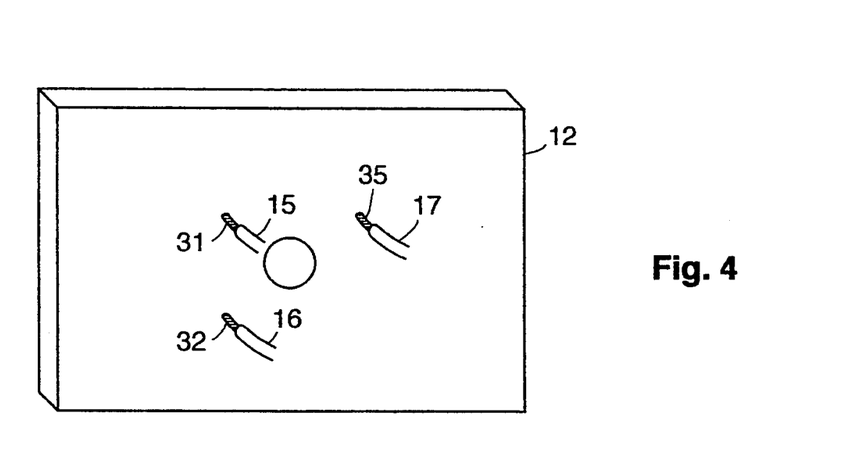
FIG. 4 illustrates the locations where the mirror tilt adjustments cables are attached to the tilt plate.

One of the many possible mechanisms for directional alignment of the mirror is described with reference to FIG. 2. The tilt plate 12 has a hole in it which rests on a ball 13, enabling it to rock in all directions. Three cables 15, 16 and 17, which are similar to the cable system 26–28, are used to adjust the tilt of the plate 12 in two orthogonal directions. The locations where the cables 15, 16 and 17 are attached to the plate 12 are more clearly shown in FIG. 4. Movement of cables 15 and 16 adjusts the tilt of the mirror around a horizontal axis, whereas movement of the cables 15 and 17 adjusts the mirror tilt around a vertical axis. Cables 15, 16 and 17 are carried as a unit into the passenger compartment to a control unit within convenient reach of the driver. The reflectivity adjustment cable 26 may also be conveniently grouped with cables 15, 16 and 17 for routing to its remote control. The remote controls for tilt and reflectivity adjustments may either be separate units or designed as an integrated unit.

Figure 5:
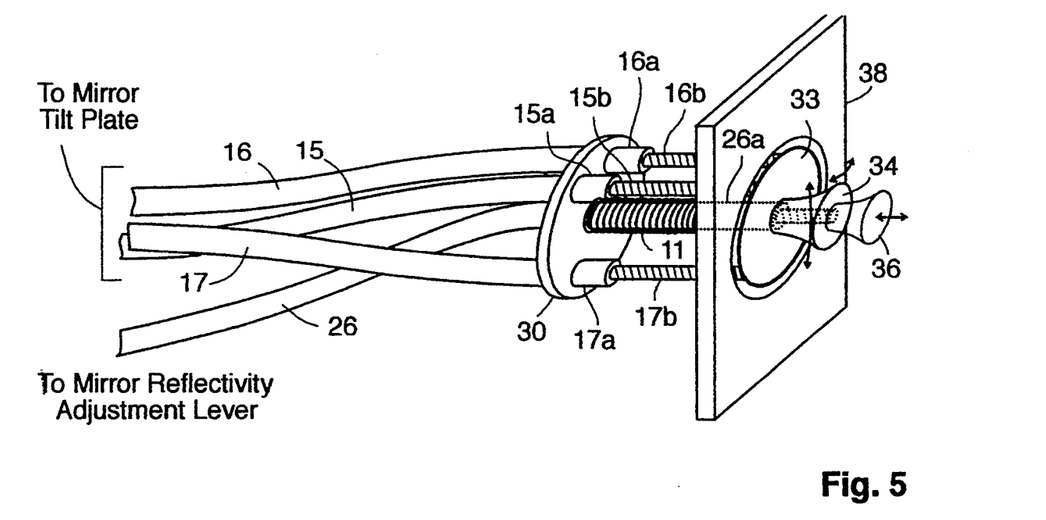
FIG. 5 presents the details of the multifunctional mirror remote control unit, showing the adjustment means for both directional alignment and high/low reflectivity selection.

An embodiment for a combinational multi-functional mirror remote control unit is shown in FIG. 5. It integrates in one unit both the directional alignment mechanism and the high/low reflectivity selection mechanism. Cable 15, 16 and 17, coming from the tilt plate 12 (FIGS. 2 and 4), have their sheaths 15a, 16a and 17a fastened in a plate 30, and their cables 15b, 16b and 17b attached to a disk 32 which is an extension of a joystick 34. The plate 30, which is affixed to the vehicle, is spring-loaded to disk 33 with a cable collar plate spring 11. As illustrated in FIG. 5, rocking of the joystick 34 in a horizontal or vertical direction adjusts the tilt of the tilt plate correspondingly, and therefore adjusts the directional alignment of the mirror.

Cable 26, coming from the reflectivity adjustment lever 22 (FIG. 2), has its sheath 26a fastened to disk 33 and its cable attached to a push-pull knob 36. Pulling or pushing the knob 36 shifts the lever 22 (FIG. 2) between its two positions, thereby selecting the mirror reflectivity between its high and low settings. The entire remote control assembly is mounted with plate 38 to a convenient location near the driver (e. g., the dashboard or the left armrest) inside the vehicle. Thus, the embodiment of FIG. 5 is a an integrated, multifunctional remote control unit capable of both adjusting the directional alignment of the mirror and selecting its reflectivity for optimum viewing in different situations.

Figure 6:
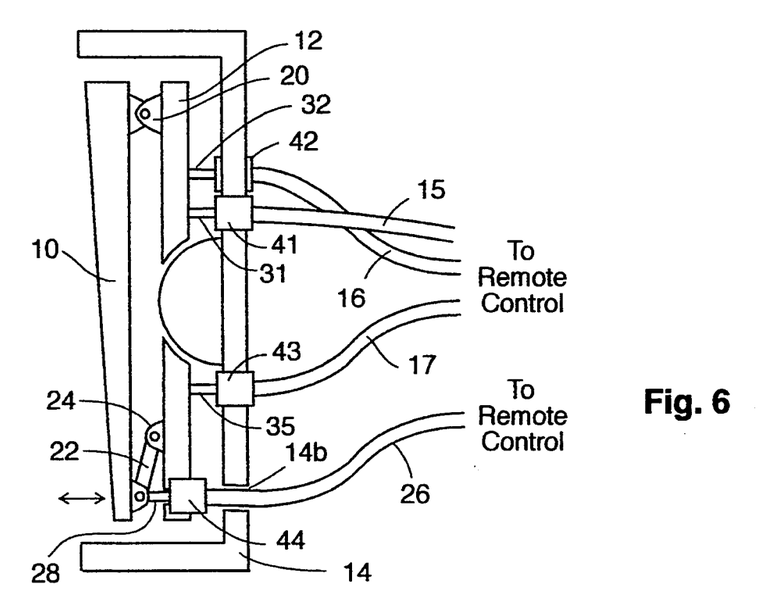
FIG. 6 is a variation of FIG. 2 in which the mechanical cable adjustment devices have been replaced by electrical motors and wires.

The embodiment disclosed above is a multifunctional remote control unit that is completely mechanical in construction. We now describe, with reference to FIG. 6, embodiments in which the various movements of the mirror are controlled by electrical signals. In FIG. 6, the numbers 41–44 denote miniature electrical motors; 31, 32, 35 and 28 their shafts; and 15–17 and 26 their electrical connections going to the remote control unit. Note that FIG. 6 is a variation of FIG. 2 such that the mechanical cables 15–17 and 26 in FIG. 2 have been replaced in FIG. 6 by linear electrical motors 41–43 and toggling motor 44 (which may be a solenoid) and their wires 15–17 and 26. As the motors 41–44 receive electrical signals from the remote control unit (shown in FIG. 7), their shafts 31, 32, 35 and 28 move in and out, providing the directional alignment and the reflectivity selection. If desired, one of the motors 41–43 may be eliminated in favor of a bass joint or equivalent spring pad, which establishes a reference point in space with respect to housing 14. Two cables 15 and 16, together with such a reference point in space, can then determine the mirror position.

Figure 7A:
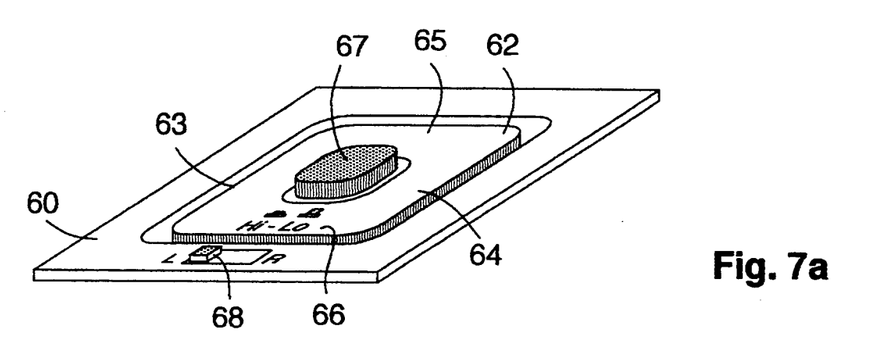
FIG. 7a shows an electrical remote control unit for the multifunctional mirror of FIG. 6.
Figure 7B:
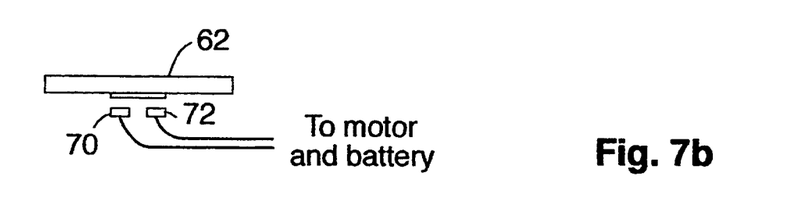

An embodiment of the electrical remote control unit to control the multifunctional mirror illustrated in FIG. 6 is shown in FIG. 7a. The unit is mounted on the dashboard or the left armrest with its mounting plate 60. Within plate 60, the rocking member 62 is designed such that its left (63), right (64), upper (65) or lower (66) rim can be pressed down. Under the rims are electrical contacts (e.g., 70 and 72 in FIG. 7b) that, when any of the four rims is pressed, cause the remote control unit to send appropriate electrical signals to the motors (41–43 in FIG. 6) in the mirror assembly so as to move the motor shafts to produce the desired adjustment in the directional alignment of the mirror. The remote control unit of FIG. 7a also has a push-button switch 67 with underlying electrical contacts similar to those shown in FIG. 7b. When the switch 67 is pushed in or out, it sends an electrical signal to motor 44 (FIG. 6), causing it to shift the mirror reflectivity between high and low. Finally, there is a servo mirror selector switch 68 (FIG. 7a) which tells the electrical system whether the control commands from the entire unit of FIG. 7a will apply to the left-side mirror or the right-side mirror. In a variation of the above embodiment, the mirror selection switch can be so configured that, where required, it may select among one or more or all of several mirrors—for example, left mirror, right mirror, and any additional passenger mirror.

Note that in FIGS. 1, 2 and 6, the wedge mirror 10 must be supported at three points in space. One of these points may be fixed in space by means of a ball joint or a spring pad. The other two other points, which are movable, can thus determine the view (directional) adjustment. The two movable points can also, by a small additional motion, toggle the wedge mirror 10 between single-reflectivity of that directional adjustment and triple reflectivity of that directional adjustment. Accordingly, a small change of coordinates, delivered by motors 41 (or 42) and 43, will toggle the mirror between high and low reflectivity positions. This is accomplished in the three-motor embodiment by algebraic addition, to one or more motors, of the appropriate signal sufficient to provide the required toggling effect. In the two-motor embodiment, one or both motors are moved by such amounts as to be sufficient for toggling. Similarly, in the manual embodiments (FIGS. 2, 4 and 5), the toggling knob 36 (FIG. 5) can be arranged to turn the wedge mirror 10 through the desired toggling angle directly by pushing the cables 15–17 (three moving points), or by pushing cables 15 (or 17) and 16 (two moving points).

The reduction of glare in the embodiments of FIGS. 1, 2, 3 and 6 is achieved by using a wedge mirror which is toggled by a specific angle so as to change it between a single-reflection position and a triple-reflection position. In alternative embodiments, one may use a plane-parallel mirror with a thin-film coating which exhibits different reflectivities at different angles. A good candidate for such a thin-film coating is a multilayer dielectric coating in which the compositions and thicknesses of the various layers are selected in such a way that in the normal viewing position the reflectivity of the multilayer stack is very high ($\sim 90\%$), whereas in the antiglare position its reflectivity is very low ($<10\%$). In other variations of the invention, it is possible to combine a wedged mirror slab and a thin-film coating having angle-dependent reflectivity to achieve other functionalities in a fully remotely controlled mirror, including customized reflectivity selection and different color balances. This forms a controllable color-balance-selecting vehicle mirror, having a wavelength-dependent reflectivity. The color-balance-selecting mirror uses color toggling means operable to toggle the color-balance-selecting mirror between a first angle providing a first color balance of the selected view at said viewing position within the vehicle and a second angle providing a second color balance of the selected view at said viewing position within the vehicle, while retaining a common directional adjustment. There is a view-angle-dependent reflectivity for a selected view.

While the invention has been described with respect to preferred embodiments with available variations of two or three prime movers, and with choice of manual or electrical motor power, it will be obvious to those skilled in the art that additional variations in form and detail may be made without departing from the spirit and scope of the invention.

What is claimed is:

1. A controllable single/multiple reflection glare-deflecting vehicle mirror system, having a wedge mirror (10) mounted in a housing, having remote control glare deflection means, and having direction adjustment mechanism, with remote control direction adjusting means, operable for directional adjustment of the wedge mirror for a selected view at a viewing position within the vehicle, said direction adjusting means comprising:

(a) a remote control mirror directional adjustment joystick (34);
 (b) a tilt plate (12) for mounting said wedge mirror;
 (c) a plurality of remote control slide cables (15–17), each having a sheath and a cable (31,32,35) within its respective sheath, each having a control end and an operating end, said operating ends being fixed to said wedge mirror (10) by means of said tilt plate (12);
 (d) a remote control cable collar plate (30) fixing the control ends (15a–17a) of the sheaths of said remote control slide cables (15–17), and having a cable collar plate spring (11);
 (e) a remote control joystick plate (33) attached to said joystick (34) and to the control ends (15b–17b) of said control slide cables (15–17);
 (f) a mirror housing (14) mountable in fixed relationship to a vehicle, having a plurality of apertures (14a) of size appropriate to affix the sheaths of said remote control slide cables (15–17) to resist longitudinal movement of the sheath while permitting longitudinal movement of the respective slide cables; said housing (14) also having an aperture (14b) of size ample to permit a remote control cable sheath to move longitudinally through said aperture (14b); and
 (g) means connecting said joystick plate (33) to said cable collar plate spring whereby a force urging said collar plate (30) away from said joystick plate (33) permits varying the effective length of said remote control slide cables (15–17) for directional adjustment of said wedge mirror (10) in response to rocking of said joystick (34): and wherein said remote control glare deflection means comprises:

(h) means to shift said wedge mirror (10) between single reflection and multiple reflection positions, when viewed from a given direction while adjusted for a given view, in response to a small relative motion of said wedge mirror (10) with respect to said tilt plate (12), urged from a remote source.

2. A controllable vehicle mirror system according to claim 1, wherein said glare deflection means further comprises:

(i) a remote Control glare deflection knob (36);
 (j) a remote control slide cable (26) having a sheath and within it a cable (28), said sheath passing through said spring (11) and connected to said plate (33), said cable having its control end affixed to said knob (36) and its operating end affixed to a toggle means (22,24);

(k) said cable collar plate (30) and said tilt plate (12) having longitudinal channels for said sheathed cable (26) to pass through; and (l) said toggle means (22,24) holding said wedge mirror (10) with respect to said tilt plate (12) to permit a toggle motion from one position to another for single reflection and multiple reflection when viewed from a given direction while adjusted for a given view, in response to a small relative motion of said wedge mirror (10) and said tilt plate (12), urged from a remote source by push/pull of said glare control knob (36).

3. A controllable single/multiple reflection glare-deflecting vehicle mirror system, having a wedge mirror (10) mounted in a housing, having remote control glare deflection means including a glare toggling motor (44) and having direction adjustment mechanism, with remote control direction adjusting means including multiple direction control motors (41-43), operable for directional adjustment of the wedge mirror for a selected view at a viewing position within the vehicle, said direction adjusting means comprising:

(a) mirror housing (14) mountable on the vehicle:

(b) a tilt plate (12) mounted for limited motion within said mirror housing (14);

(c) remote mirror direction adjustment control means, effective to provide separate control signals to each of said wedge mirror direction control motors (41-43) and to said glare toggling means (44);

(d) a plurality of mirror positioning direction control motors (41-43) affixed operatively to said wedge mirror (10) to cause mirror motion with respect to said mirror housing (14) to a number of mirror directional positions in response to said plurality of mirror positioning signals;

whereby direction adjustment of said wedge mirror (10) is operable by remote control independently of said remote control glare deflection means: and said remote control glare deflection means comprises:

(e) a glare toggling motor (44), operatively connected to provide relative motion between first and second positions of said tilt plate (12) and said wedge mirror (10); and (f) toggle means (22,24) holding said wedge mirror (10) with respect to said tilt plate (12) to permit a toggled motion from one position to another for single reflection and multiple reflection when viewed from a given direction while adjusted for a given view, in response to a small relative motion between said wedge mirror (10) and said tilt plate (12), when urged by a remote source through said glare toggling motor (44).

4. A controllable single/multiple reflection glare-deflecting vehicle mirror system, having a wedge mirror (10) mounted in a housing, and having remote control direction adjusting mechanism, operable for direction adjustment of the wedge mirror for a selected view position, comprising:

(a) a mirror housing (14) mountable on the vehicle:

(b) a tilt plate (12) mounted for limited motion within said mirror housing (14);

(c) a plurality of remote control slide cables (15-17), each having a sheath and a cable (31,32,35) within its respective sheath, each having a control end and an operating end, said operating ends being fixed to said wedge mirror (10) by means of said tilt plate (12);

(d) a plurality of apertures (14a), in said housing (14), of size appropriate to affix the sheaths of said remote control slide cables (15-17) to resist longitudinal movement of the sheath while permitting longitudinal movement of the respective slide cables; said housing (14) also having an aperture (14b) of size ample to permit a remote control cable sheath to move longitudinally through said aperture (14b); and (e) a remote control cable collar plate (30) fixing the control ends (15a-17a) of the sheaths of said remote control slide cables (15-17);

whereby direction adjustment of said wedge mirror (10) is operable by remote control; and further comprising:

(f) a remote control mirror switch plate (60);

(h) a glare control toggling tap switch (67), mounted on said switch plate (60), for providing a glare toggling control signal; and (g) a glare toggling control motor (44) operatively connecting said wedge mirror (10) with respect to tilt plate (12), responsive to the glare toggling signal from said switch plate (60) to toggle the wedge mirror (10) to the desired glare position.

5. A controllable single/multiple reflection glare-deflecting vehicle mirror system, having a wedge mirror mounted in a housing, and having remote control direction adjusting mechanism operable for directional adjustment of the wedge mirror for a selected view position, said remote control direction adjusting means comprising:

(a) a remote control mirror direction adjustment switch plate (60) with means for providing direction control signals and a glare toggling signal;

(b) a tilt plate (12) mounted for limited motion within said mirror housing (14);

(e) a plurality of mirror directional control motors (41-43) mounted with respect to said tilt plate (12) for directional adjustment of the wedge mirror (10) in response to direction control signals from said switch plate (60); and (f) a glare toggling control motor (44) responsive to the glare toggling signal from said switch plate (60) to toggle the wedge mirror (10).

6. A remote controllable high-reflection/low-reflection glare-deflecting vehicle mirror system, having a dual-reflectivity mirror and having directional adjustment mechanism, comprising remote control direction adjusting means, operable for a directional adjustment of the dual-reflectivity mirror, for a selected view at a viewing position within the vehicle, said dual-reflectivity mirror having at least one thin-film coating having an angle-dependent reflection coefficient; and remote control glare toggling means operable to toggle the dual-reflectivity mirror between a high-reflection of the selected view at said viewing position within the vehicle and a low-reflection of the selected view at said viewing position within the vehicle, while retaining the directional adjustment.

7. A controllable color-balance-selecting vehicle mirror system, having a wavelength-dependent reflectivity, and having directional adjustment mechanism, operable for a directional adjustment of said color-balance-selecting mirror for a selected view at a viewing position within the vehicle, comprising color toggling means operable to toggle the color-balance-selecting mirror between a first angle providing a first color balance of the selected view at said viewing position within the vehicle and a second angle providing a second color balance of the selected view at said viewing position within the vehicle, while retaining a common directional adjustment.

8. A controllable multiple dielectric thin film vehicle mirror system, having a view-angle-dependent reflectivity mirror for a selected view at a viewing position within the vehicle, comprising toggling means operable to toggle said mirror between a first angle providing a first reflectivity of the selected view at said viewing position within the vehicle and a second angle providing a second reflectivity of the selected view at said viewing position within the vehicle, while retaining a common directional adjustment.

9. A remote control combination wedge and multiple dielectric thin film vehicle mirror system, having a view-angle-dependent reflectivity as a result of multiple dielectric thin films, and also having a number-of-reflections-dependent reflectivity as a result of orientation of a wedge mirror, comprising:
(a) a wedge mirror;
(b) a multiple dielectric thin film arrayed on the surface of said wedge mirror; and
(c) toggling means operable to move said wedge mirror between a first angle providing a first number of reflections for the selected view position, and a second angle providing a second number of reflections for the selected view position, while retaining a common directional adjustment;
whereby the mirror system provides dual means of glare control.

10. A controllable single/multiple reflection glare-deflecting vehicle mirror system, having a wedge mirror (10) mounted in a housing, having remote control glare deflection means, and having direction adjustment mechanism, with remote control direction adjusting means, operable for directional adjustment of the wedge mirror for a selected view at a viewing position within the vehicle, said direction adjusting means comprising:
(a) a mirror housing (14) mounted on the vehicle;
(b) a tilt plate (12) mounted for limited motion within said mirror housing (14);
(c) a remote control mirror direction adjustment switch plate (60), effective to provide a plurality of mirror positioning signals;
(d) a mirror control signal subsystem having a control plate (62) and a plurality of directional motor control switches (70, 72) juxtaposed to provide mirror directional motor operating signals in response to rocking of said control plate (62);
(e) a glare control switch (67) mounted on said mirror control plate (62);
whereby said wedge mirror (10) is adjustable to a selected view by remote control independently of said remote control glare deflection means; and further comprising:
(f) a glare toggling motor (44); and
(g) remote control glare toggling means (22,24) holding said wedge mirror (10) with respect to said tilt plate (12) to permit toggle motion of said mirror from one position to another for single reflection and multiple reflections when viewed from a given direction while adjusted for a given view, in response to a small relative motion between said wedge mirror (10) and said tilt plate (12), controlled by a signal to said glare toggling motor (44) from said remote glare control switch (67).

11. A remotely controllable vehicle mirror system according to claim 10,
further comprising:
a mirror selection switch (68) mounted adjacent to said glare control toggling switch (67) in said mirror control system, said mirror selection switch (68) operating to direct all mirror positioning control signals to a selected mirror.

12. A controllable high-reflection/low-reflection glare-deflecting vehicle mirror system having a dual-reflectivity mirror, and having directional adjustment mechanism, having remote control direction adjusting means, operable for a directional adjustment of the dual-reflectivity mirror for a selected view at a viewing position within the vehicle; and comprising:
at least one thin-film coating on the mirror, having an angle-dependent reflection coefficient; and
remote control glare toggling means operable to toggle the dual-reflectivity mirror between a high-reflection of the selected view at said viewing position within the vehicle and a low-reflection of the selected view at said viewing position within the vehicle, while retaining a common directional adjustment.

13. A remote-control vehicle mirror system, having a mirror (10) with a number of view positions each having a related glare-reduced position, wherein said remote control direction adjusting means comprises:
(a) mirror housing (14) mountable on the vehicle:
(b) a tilt plate (12) mounted for limited motion within said mirror housing (14), operable to allow mirror movement from each of said number of view positions to respectively related reduce-glare view positions;
(c) a remote control mirror directional adjustment switch pad means (60), effective to provide a first set of mirror positioning signals and a related second set of reduced-glare mirror positioning signals;
(d) a set of mirror positioning direction control motors (41–43) affixed operatively to said mirror (10) to cause mirror repositioning with respect to said mirror housing (14) to a number of mirror directional positions in response to said first set of mirror positioning signals and in response to said second set of reduced-glare mirror positioning signals;
(e) control means for switching from said first set of mirror positioning signals to said second set of reduced-glare mirror positioning signals and back;
whereby said mirror (10) is adjustable by remote control to provide for glare toggling as well as view positioning.

14. The mirror system of claim 13 in which said remote control mirror directional adjustment switch pad means (60) comprises a tap switch (67) and said control means comprises a connection to tap switch (67) and has related tap switch controlled toggling electronics.

* * * * *